United States Patent [19]

Batzdorff

[11] 4,161,368

[45] Jul. 17, 1979

[54] BRICK BLENDING APPARATUS

[75] Inventor: Alfred Batzdorff, Langhorne, Pa.

[73] Assignee: The Keller Corp., Hatfield, Pa.

[21] Appl. No.: 875,304

[22] Filed: Feb. 6, 1978

[51] Int. Cl.$^2$ .............................................. B65G 59/02
[52] U.S. Cl. ..................................... 414/114; 198/419;
198/420; 198/434; 414/32; 414/120
[58] Field of Search ........................... 214/6 A, 8.5 C;
198/419, 420, 421, 434, 448

[56] References Cited

U.S. PATENT DOCUMENTS

| | | | |
|---|---|---|---|
| 3,601,266 | 8/1971 | Pearne et al. | 214/8.5 C |
| 3,608,746 | 9/1971 | Meyer | 214/6 A |
| 3,656,635 | 4/1972 | Schafer et al. | 214/8.5 C |
| 3,669,283 | 6/1972 | Brown | 214/8.5 C |
| 3,837,466 | 9/1974 | Jones | 198/420 X |
| 3,905,489 | 9/1975 | Berndt | 214/6 A |
| 4,036,350 | 7/1977 | Jones | 198/420 |

FOREIGN PATENT DOCUMENTS 919118  1/1973  Canada ................................... 198/420

*Primary Examiner*—L. J. Paperner
*Attorney, Agent, or Firm*—Howson and Howson

[57] ABSTRACT

Apparatus for selectively blending rows of bricks includes a blending station having a blending area into which bricks are introduced from first and second staging areas on opposite sides of the blending area. In a preferred embodiment, the bricks are delivered by conveyors to the staging areas in spaced parallel rows. Brick transfer means are provided for each brick row in each staging area and may be selectively actuated to transfer rows of bricks into the blending area in the desired blend, the rows being moved longitudinally so as to interleave with the rows from the opposite staging area. Retractable guide means are provided to prevent interference between the oppositely moving rows of bricks. Upon retraction of the guide means, a conveyor moves the bricks from the blending area to permit the repetition of the blending operation.

In a preferred form of the invention, the conveyors for delivering bricks into the opposed staging areas are supplied with bricks from a plurality of brick hacks which are deposited in hack nests alongside the conveyors. Gripper-trolleys arranged transversely of the conveyors are capable of transferring bricks from any of the brick hacks onto either conveyor. Brick defacing means are provided along each conveyor run to carry out an in-line defacing operation.

12 Claims, 5 Drawing Figures

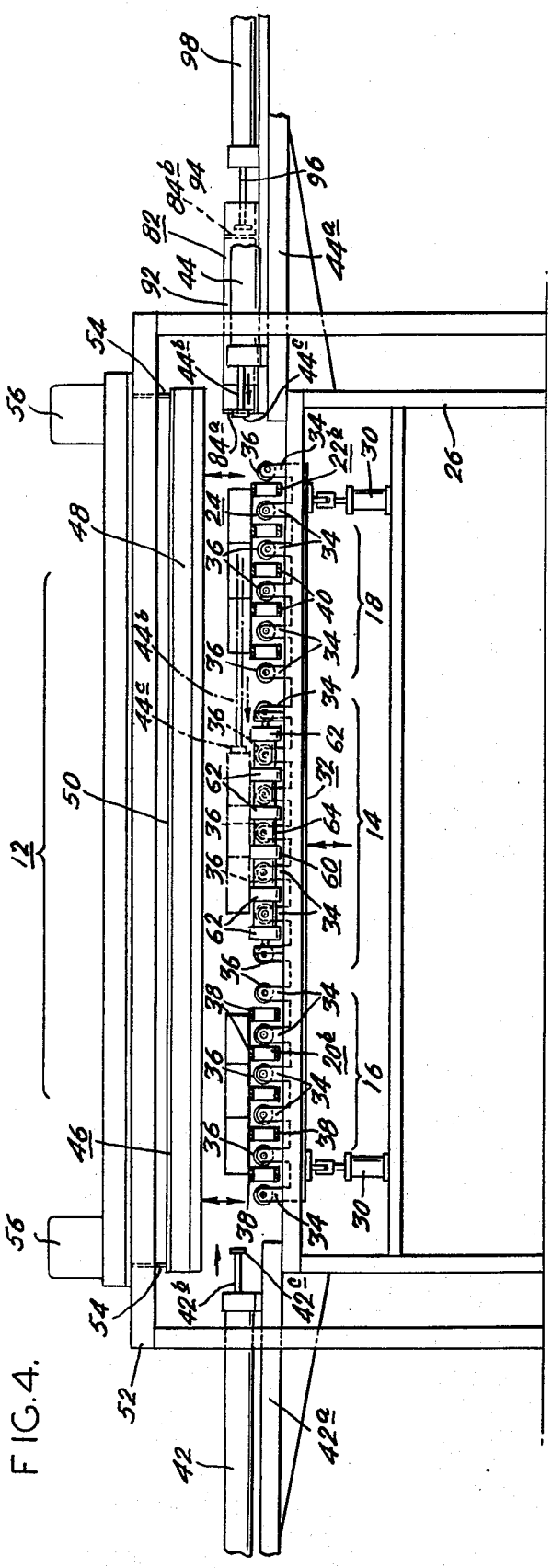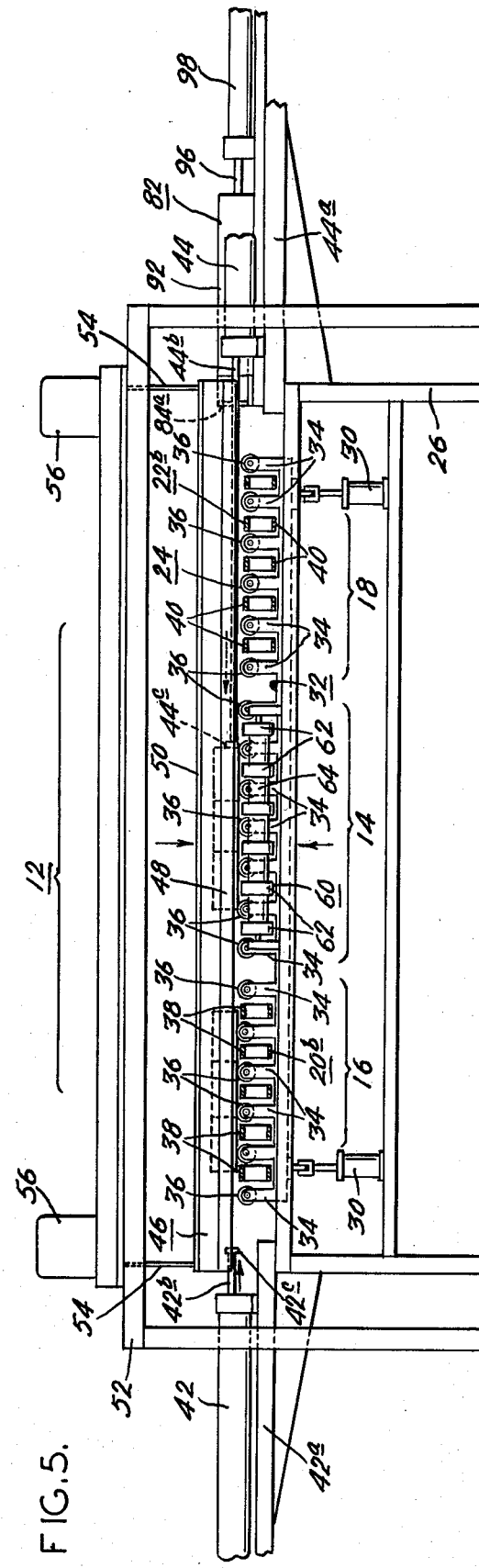

BRICK BLENDING APPARATUS

BACKGROUND OF THE INVENTION

The present invention relates generally to apparatus for manufacturing and packaging bricks and relates more particularly to brick blending apparatus for providing a selective mixing of rows of bricks from two sources in any desired proportion.

In the manufacture of bricks, the unfired bricks are conventionally loaded on kiln cars in a criss-cross stack known as a brick hack. The bricks are arranged in the hack in the form of grids set at right angles to the adjacent grid, each grid conventionally consisting of two layers of bricks set in face-abutting relation. The bricks in each layer are usually arranged in end-abutting fashion in spaced double rows to permit the bricks to be relatively uniformly exposed to the kiln conditions. There still remains, however, a sufficient difference in the brick firing conditions depending upon the position of the brick in the hack and the position of the kiln car in the kiln to produce color variations of bricks within the hack and between different hacks. Since bricklayers normally lay the bricks in substantially the same order in which they are packaged, it is desirable that the bricks be blended following firing and before packaging in a manner which will minimize the effects of color variations when the bricks are laid.

In some cases, it is desired to mix bricks of two or more colors or textures in a predetermined ratio or to add random accent bricks to a substantially uniform brick production run.

Equipment has not heretofore been developed which provides the flexibility of operation of the present apparatus to selectively effect either the mixing of bricks of the same type and color, the blending of bricks of dissimilar colors or types, or the addition of accent bricks in a random fashion.

SUMMARY OF THE INVENTION

The present invention includes a brick blending station having a blending area into which bricks are introduced in parallel spaced rows from first and second staging areas at opposite sides of the blending area. The bricks are arranged in each staging area so as to interleave with rows of bricks from the opposite staging area when selectively transferred by brick transfer means into the blending area. Retractable guide means prevents interference between the brick rows during the transfer of the bricks into the blending area. Conveyor means move the blended bricks from the blending area following retraction of the guide means.

In the preferred embodiment of the invention, the bricks are delivered to the blending station staging areas by spaced parallel conveyors which are supplied with bricks from a plurality of brick hacks located in hack nests arranged alongside the conveyors. Gripper trolleys disposed transversely of the conveyors permit the selective transfer of the double layer brick grids from the brick hacks onto either conveyor. Brick defacing equipment is provided on each conveyor to remove and invert the upper brick layer and place it in face-up relation adjacent the lower layer on the conveyor. Acceleration sections of each conveyor are driven at speeds appropriate to produce the desired spacing of the brick rows required for the staging areas. The brick transfer means for moving the brick rows selectively from the staging areas into the blending area may be programmed or manually operated to move any desired number of the brick rows in each staging area into the blending area and accordingly the resultant blend of the brick rows may be readily changed. The advance of the conveyors in the preferred embodiment is automatically controlled so as to fill the staging areas on each side of the blending area with brick rows prior to each brick transfer operation.

It is accordingly a first object of the present invention to provide a brick blending apparatus for blending rows of brick.

Another object of the invention is to provide brick blending apparatus as described which may be readily adjusted to selectively change the brick blend.

A further object of the invention is to provide a brick blending apparatus as described which is adapted to receive a plurality of brick hacks and to selectively blend the bricks from the brick hacks in any desired manner.

Still another object of the invention is to provide a brick blending apparatus as described which includes means for adding accent bricks in a random manner to the blended brick output.

A still further object of the invention is to provide a brick blending apparatus as described which is adaptable to automated controls.

Additional objects and advantages of the invention will be more readily apparent from the following detailed description of a specific embodiment thereof.

BRIEF DESCRIPTION OF THE DRAWINGS

FIG. 4 is a view partly in section taken along line 4—4 of FIG. 1 showing details of the blending station; and FIG. 5 is a view similar to FIG. 4 but showing the blending station with the brick guide assembly lowered and the brick transfer rolls raised during the brick transfer operation.

DESCRIPTION OF THE PREFERRED EMBODIMENT

Figure 1:
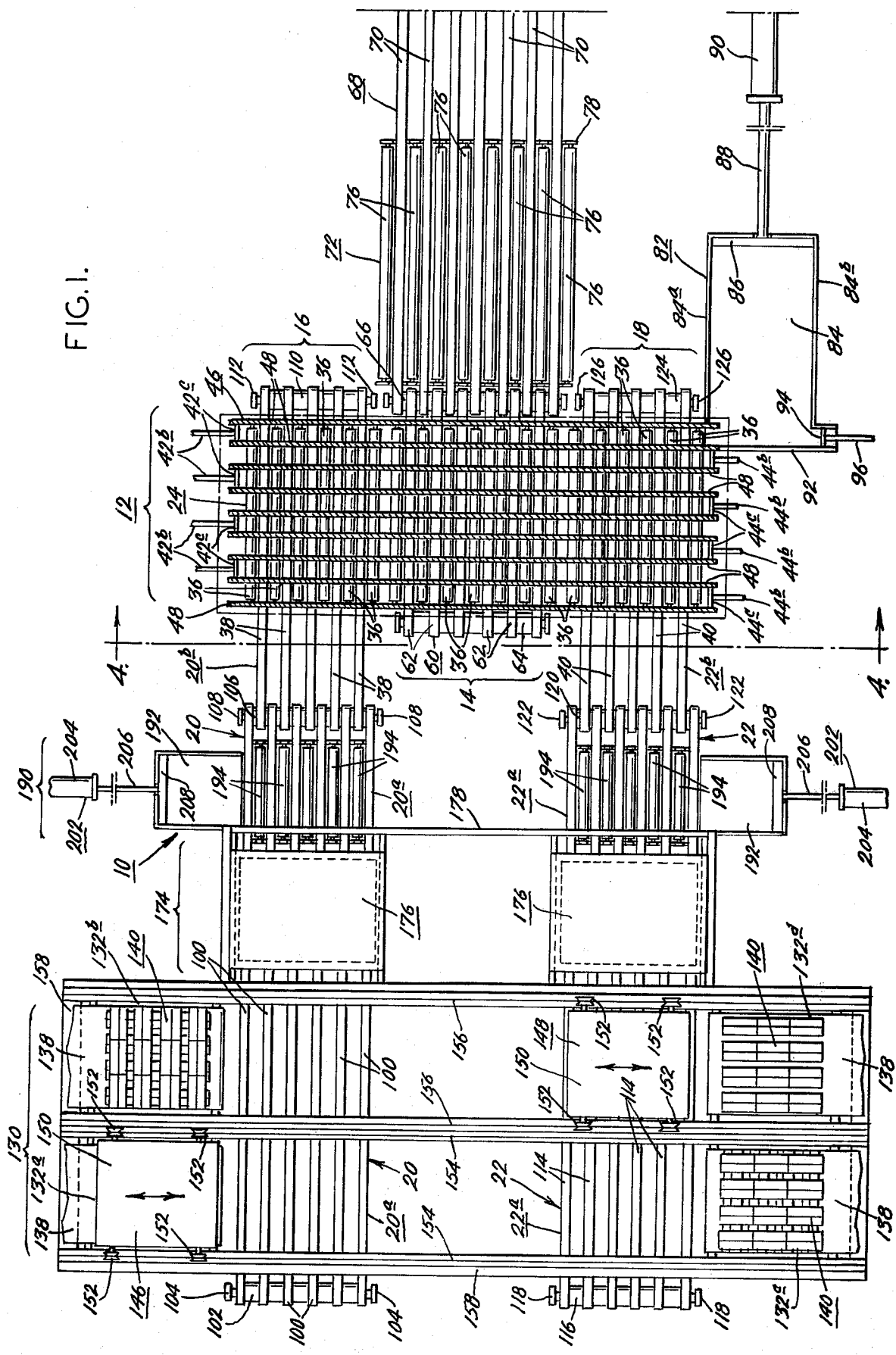
FIG. 1 is a plan view of brick blending apparatus embodying the present invention with portions thereof broken away and schematically for clarity.
Figure 2:
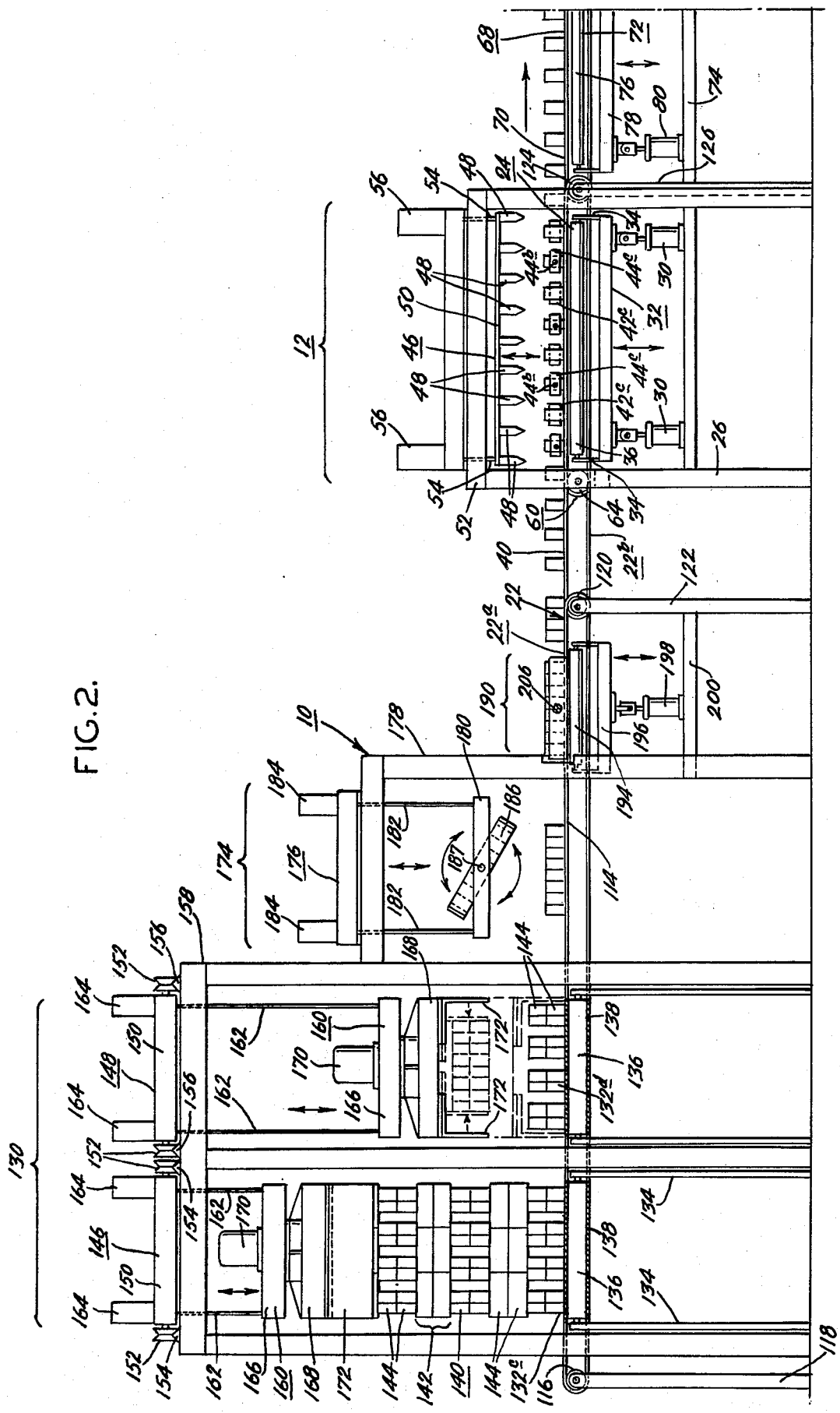
FIG. 2 is a side elevational view of the apparatus illustrated in FIG. 1.

Referring to the drawings and particularly FIGS. 1 and 2 thereof, a preferred embodiment of the present invention comprises a brick blending apparatus generally designated 10 including a brick blending station 12 comprising a brick blending area 14 flanked by brick staging areas 16 and 18 at opposite sides thereof. Means are provided for delivering rows of bricks in spaced parallel relation into a predetermined position in each of the brick staging areas. In the preferred form of the invention, conveyor assemblies 20 and 22 arranged in spaced parallel relation are employed for delivering the bricks to the staging areas in the desired relation. The conveyor assemblies 20 and 22 are belt-type conveyors and comprise brick loading sections 20a and 22a and acceleration sections 20b and 22b respectively. The details of the conveyors 20 and 22 and the brick handling apparatus associated therewith are discussed in further detail hereinbelow.

The blending station 12 as shown most clearly in FIGS. 1, 2, 4 and 5 includes brick transfer means for moving rows of bricks from the staging areas into the blending area. The brick transfer means includes a cross feed conveyor assembly 24 comprising a support frame 26 on which are mounted a plurality of fluid actuated cylinders 30. The cylinders 30 support a roller frame 32 which includes upstanding roller support elements 34 providing a pivotal support for parallel spaced cross feeding rollers 36. The rollers 36 extend substantially throughout the staging areas 16 and 18 as well as the blending area 14. By actuation of the cylinders 30, the frame 32 and the rollers 36 supported thereon may be selectively raised to the position shown in FIG. 5 wherein the rollers extend above the belt conveyors in the blending station, or may be retracted as shown in FIG. 4 wherein the rollers are below the conveyor runs.

The accelerating conveyors 20b and 22b comprise in the preferred embodiment a plurality of spaced parallel belts 38 and 40 respectively. As described in further detail hereinbelow, the speed of the accelerating conveyors 20b and 22b is greater than that of the conveyor sections 20a and 22a such that the rows of bricks delivered thereby are spaced apart a predetermined distance. When the accelerating conveyors 20b and 22b have delivered the requisite number of rows of bricks to the staging areas 16 and 18 respectively, the conveyors are stopped and the brick transfer means are employed to selectively move the rows of bricks in the desired ratio from the staging areas into the blending area 14. In addition to the conveyor assembly 24 which is raised to elevate the rows of bricks from the belts 38 and 40 onto the rollers 36, the brick transfer means includes a plurality of selectively operable fluid-actuated brick transfer cylinders 42 and 44 disposed respectively adjacent the brick staging areas 16 and 18. The cylinders 42 and 44 are respectively mounted on support brackets 42a and 44a extending from the frame 26. Piston rods 42b and 44b of the cylinders 42 and 44 respectively terminate in pusher plates 42c and 44c adapted to engage the end of a row of bricks and transfer the row into the blending area as shown in FIG. 5.

In the illustrated embodiment of the invention, as shown in FIGS. 1 and 2, there are four brick transfer cylinders positioned adjacent each brick staging area and accordingly as many as four rows of bricks from each staging area may be moved into the blending area during a single blending operation. The number of cylinders adjacent the blending areas may obviously be varied depending upon the range of blending ratios desired. A typical apparatus would be expected to have more than four cylinders adjacent each blending station and typically would have a number sufficient to form a blend of eleven brick rows.

From FIG. 1 it can be seen that the cylinders 42 are arranged in staggered relation with respect to the cylinders 44 such that the rows of bricks transferred from one of the staging areas will interleave with the rows of bricks transferred from the other staging area. To insure against any possible misalignment of the brick rows during the blending operations, retractable guide means comprising a retractable guide assembly 46 is provided. The guide assembly 46 includes a plurality of spaced parallel fence elements 48 extending vertically downwardly from a horizontal fence frame 50 suspended beneath a support frame 52. The fence frame 50 is suspended by cables 54 at the four corners thereof which are controlled by motor assemblies 56 disposed on the frame 52. The retractable guide assembly 46 is lowered into the position shown in FIG. 5 during the brick blending operations with the fence elements 48 thereof delineating guide paths for the rows of bricks and preventing interference between adjacent rows during the brick movement. Upon completion of the blending operations, the guide assembly is retracted upwardly into the position shown in FIG. 4 by operation of the motors 56.

A blending conveyor 60 in the blending area 14 receives the blended rows of bricks when the rollers 36 are lowered. The conveyor 60 comprises a plurality of spaced parallel belts 62 which pass over a drive roll 64 journalled to the frame 26 at one end thereof, and over an idler roll 66 at the other end thereof. Drive means (not shown) for the drive roll 64 is arranged to provide intermittent drive of the belt 62 to transport the blended rows of bricks onto a wider conveyor 68 comprising spaced belts 70 passing at one end over the idler roll 66. The conveyor 68 may if desired be driven at a faster speed than the blending conveyor to provide a separation of the brick rows for inspection purposes.

A brick spreader assembly 72 of a known type is provided on a frame 74 beneath the conveyor 68 and comprises a plurality of cross feed rolls 76 which may be raised above the belts. The rolls 76 are rotatably supported on a frame 78 which is selectively raised or lowered by fluid actuated cylinders 80 mounted on frame 74 as shown in FIG. 2. The rolls 76 are independently driven in rotation by appropriate drive means (not shown), half of the rolls being driven in one direction and the other half being driven in the opposite direction to effect a spreading of the bricks.

A magazine feed assembly 82 is provided adjacent the staging area 18 for use when it is desired to feed a small number of contrasting bricks into a blend. The assembly 82 includes a magazine table 84 onto which the contrasting bricks are loaded in rows arranged parallel to the rows advanced by the conveyors 20 and 22. Side rails 84a and 84b of the table 84 serve to align the rows and a pusher 86 attached to piston rod 88 of the fluid-actuated cylinder 90 selectively advances the brick rows toward one end of the table 84 into engagement with end wall 92 thereof. A pusher 94 on piston rod 96 of cylinder 98 (FIGS. 4 and 5) is selectively actuatable to introduce a single row of contrasting bricks into the blending area by way of the staging area 18.

Considering the details of the conveyors 20 and 22, the brick loading section 20a of the conveyor 20 comprises spaced parallel belts 100 passing over drive roll 102 on support members 104 at one end thereof, and over idler roll 106 on support members 108 at the other end thereof. The belts 38 of the acceleration section 20b pass around the idler roll 106 at one end thereof and around drive roll 110 on support members 112 at the other end thereof. The idler roll 106 is segmentally constructed to permit the belts 38 and 100 to be driven at different speeds. The drive rolls 102 and 110 are driven by conventional drive means (not shown).

Similarly, the brick loading section 22a of conveyor 22 comprises spaced parallel belts 114 passing at one end over drive roll 116 on support members 118 and at the other end around idler roll 120 on support members 122. The belts 40 of the acceleration section 22b pass around the idler roll 120 at one end and around a drive roll 124 journalled on support members 126 at their other end. The idler roll 120 is segmental to permit the speed variation between the belts 40 and the belts 114. The drive rolls 116 and 124 are driven by conventional drive means (not shown).

Figure 3:
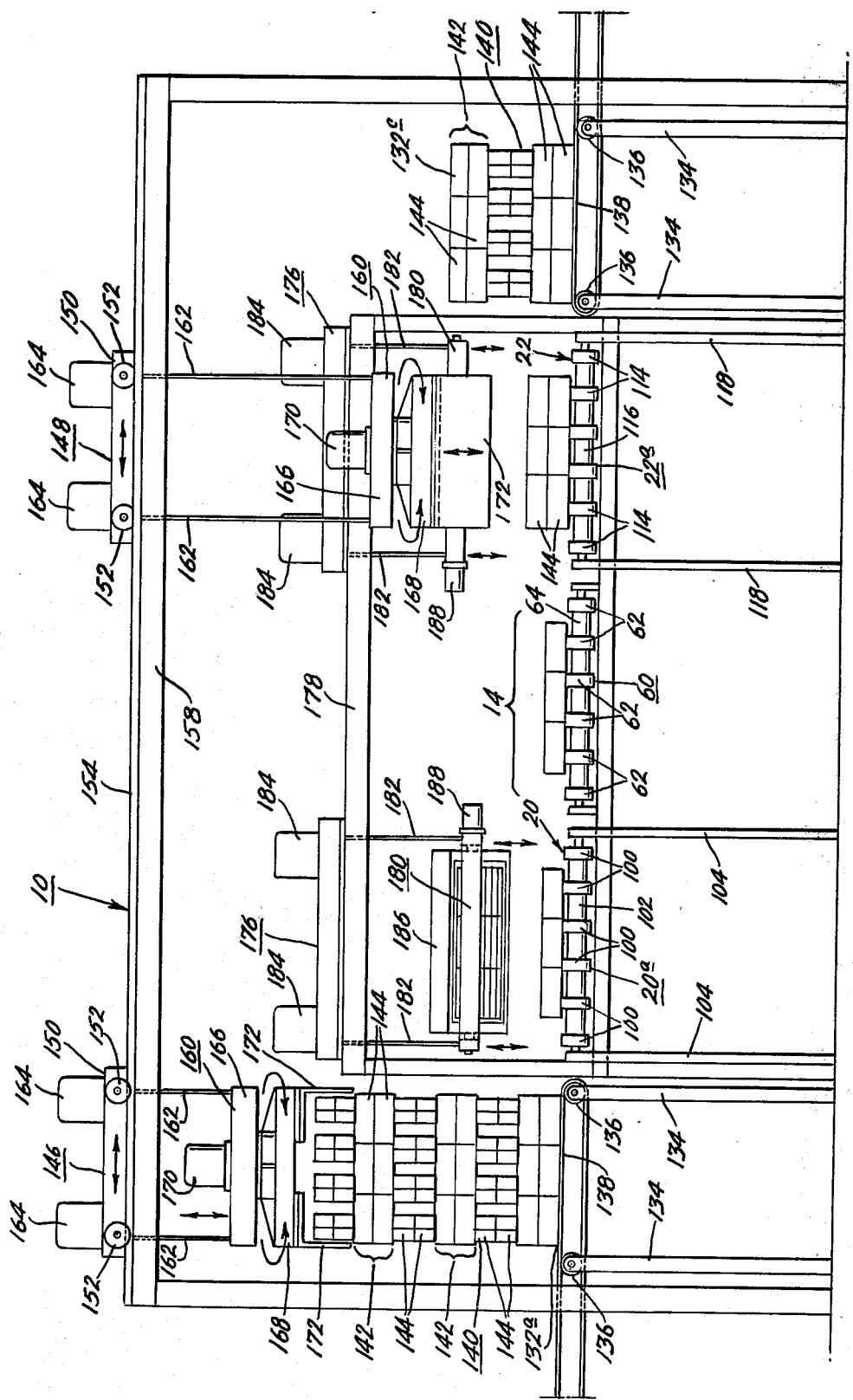
FIG. 3 is an end elevational view of the apparatus shown in FIG. 1 looking into the lefthand end thereof.

A brick loading station 130 includes hack nests 132a, 132b, 132c and 132d disposed adjacent the conveyors 20 and 22. The hack nests 132a and 132b are disposed adjacent the conveyor section 20a directly opposite the hack nest 132c and 132d respectively which are located adjacent the conveyor section 22a. The hack nests are identical in construction and each include support members 134, at the upper ends of which are journalled spaced conveyor rolls 136. A conveyor belt 138 extends across the rolls 136 of each hack nest and is adapted to support a brick hack 140 in each hack nest as illustrated in FIGS. 2 and 3. In the presently illustrated embodiment, the belts 138 extend laterally into adjacent temporary storage areas (not shown) to permit the brick hacks to be moved directly from the storage areas into the hack nests by conveyor movement. In an alternate embodiment (not shown), the rolls 136 and conveyors 138 are replaced by a rigid table surface onto which the hacks are loaded by lift truck.

The brick hacks 140 as described above each include a plurality of grids 142 of bricks set at right angles to the adjacent grids, each grid comprising two layers of bricks stacked in face to face relation. Each layer 144 of the illustrated hack comprises eight rows of bricks with each row containing three bricks in end-abutting relation. The rows are arranged in pairs of adjoining rows with spaces inbetween to permit a relatively uniform heating of the bricks in the kiln. The arrangement of the bricks in the hacks may vary from that shown without affecting the operation of the apparatus.

Brick dehacking means is provided for selectively transferring grids (double layers) of bricks from a hack in any of the hack nests to either of the conveyors 20 or 22. The dehacking means comprises a pair of gripper-trolley assemblies 146 and 148 which are identical in construction, each including a trolley 150 having grooved wheels 152. The trolley of assembly 146 is adapted to run on parallel rails 154 whereas the assembly 148 is adapted to run on rails 156 parallel thereto. The rails 154 and 156 are mounted on a support frame 158 which spans the brick loading station 130. The rails 154 and 156 extend transversely to the conveyors 20 and 22 and are positioned to carry the gripper-trolley assembly 146 over the hack nests 132a and 132c, and the gripper-trolley assembly 148 over the hack nests 132b and 132d. The trolleys 150 include means (not shown) for selectively positioning the trolleys at the desired position on the rails. Each of the trolleys 150 carries therebeneath a gripper assembly 160 which is supended therefrom on cables 162 and selectively raised and lowered by motors 164. The gripper assemblies 160 include a yoke 166 suspended by the cables 162 and a gripper head 168 rotatably extending beneath the yoke. The gripper head is selectively rotatable by operation of motor 170 mounted on the yoke. Parallel gripper jaws 172 extending downwardly from the gripper head 168 are adapted to engage the outermost rows of brick grid and are inwardly actuatable as shown in broken lines in FIG. 2 to close the spaces in the grid and to grip the brick layers with sufficient force to enable the entire grid to be lifted and selectively transferred to either of the conveyors 20 or 22. The actuating means for the gripper jaws (not shown) may comprise hydraulic, pneumatic or electro-mechanical means of well-known types.

Following loading onto the conveyors 20 and 22, the bricks pass through a defacing station 174 which comprises identical defacing assemblies 176 along each conveyor for removing the upper brick layer, inverting it to turn the faces of the bricks of that layer upwardly, and replacing it on the conveyor adjacent the lower layer. The defacing assemblies 176 are mounted on a frame 178 extending above and transversely across the conveyors 20 and 22 and comprise a defacer head 180 suspended by cables 182 controlled by gear motors 184 mounted above the frame. A clamping frame 186 pivotally mounted to the head 180 and selectively rotatable about a horizontal axis 187 by actuation of motor 188 is adapted to fit over a brick layer and includes clamping means for gripping the layer to permit the lifting and inversion of the layer. The layer is then replaced upon the conveyor following passage of the previously underlying brick layer.

For blending situations wherein the number of parallel rows of bricks desired in each layer does not match the number of rows of bricks delivered, an excess brick removal station 190 is provided along each of the conveyor sections 20a and 22a and includes an excess brick reservoir table 192 mounted adjacent each conveyor. Cross feed rolls 194 located between the conveyor belts are rotatably supported by frame 196 which is selectively raised or lowered by fluid-actuated cylinders 198 mounted on frame 200. A pusher/puller assembly 202 includes a fluid-actuated cylinder 204, the piston rod 206 of which is connected with a pusher/puller plate 208 adjacent the reservoir table 192. With the rolls 194 in the elevated position, excess rows of bricks in the excess brick removal station 190 may be removed from the delivered layer or incomplete layers may be completed by adding rows of bricks to the layers on the conveyors by operation of the pusher/puller assembly 202.

For operation of the described apparatus, hacks of the bricks to be blended are loaded into the hack nests by fork lift trucks or other suitable brick transfer means. The brick hacks may be transferred to the hack nests directly from kiln cars or from storage facilities. For blending programs which call for the addition of accent bricks, the magazine feed assembly 82 is loaded with the contrasting bricks. The gripper-trolley assemblies 146 and 148 are selectively employed to transfer bricks from the hacks onto the conveyor sections 20a and 22a in accordance with a predetermined blending program. The gripper-trolleys may be manually controlled or may be automatically programmed to follow a predetermined conveyor loading route. Brick sensing devices can be employed on the gripper assemblies to guide the gripper assemblies, to guide the gripper jaws and control their descent. Alternate grids are rotated 90° by actuation of motors 170 to align all of the grids transversely to the conveyors.

The conveyor sections 20a and 22a are driven intermittently to convey the double layer grids 142 of bricks into position beneath the defacing assemblies 176. Upon stopping of a conveyor with a brick grid directly beneath a defacing assembly 176, the defacer head 180 is lowered until the clamping frame 186 surrounds the upper brick layer of the grid. The clamping means are then actuated to secure the layer in the frame and the frame is then raised and rotated by actuation of the motor 188 to invert the layer. The conveyor is then restarted to move the lower brick layer beyond the defacing station, following which the defacer head is lowered and the clamping frame 186 released to deposit the inverted upper layer on the conveyor.

Should an excess number of brick rows be present in the brick layers, the conveyor is stopped when a particular layer of bricks is aligned with the excess brick removal station 190. The cylinder 204 is then actuated to remove the excess row of bricks from the brick layer in the station. When the number of brick rows on one of the brick reservoir tables 192 is sufficient to form a complete layer, the cylinder 204 is actuated to return the newly formed layer to the conveyor.

Should an insufficient number of rows be present in the conveyed layers, some of the layers can be removed to the reservoir tables 192 and rows therefrom can be used to complete the remaining conveyed layers.

The acceleration sections 20b and 22b of the conveyors 20 and 22 are driven at a faster speed than sections 20a and 20b to provide a spacing of the brick rows which is equal to the spacing between the fence elements 48 of the guide assembly 46 as illustrated in FIG. 2. The conveyor sections 20b and 22b are also driven intermittently and are each independently stopped when the lead row of bricks is aligned with the last brick transfer cylinder adjacent that conveyor section, thereby assuring that a brick row is available in line with each transfer cylinder. Suitable brick position detecting means can be employed to automatically stop the acceleration conveyors when the brick rows are properly aligned and fill all of the brick transfer cylinder slots.

When the brick rows have been advanced by the acceleration conveyors into the staging areas in the proper predetermined position in alignment with the transfer cylinders and the conveyors have been stopped, the guide assembly 46 is lowered into the position shown in FIG. 5 and at the same time the cross feeding rollers 36 are raised by actuation of the cylinders 30 to lift the brick rows from the conveyor belts 30a and 40a. The transfer cylinders 42 and 44 are then actuated selectively to move the brick rows in a predetermined ratio from the staging areas into the blending area in the manner shown in broken lines in FIG. 4. The cylinders 42 and 44 may be actuated in any desired ratio. For example, all four of the cylinders 42 may be actuated while only two of the cylinders 44 may be actuated during a given blending operation. In the event that less than all of the cylinders adjacent a given staging area are actuated, those that are actuated should be the ones adjacent the lead rows of bricks to prevent nonrefillable gaps from arising in the array of brick rows on the acceleration conveyors. The actuation of the transfer cylinders 42 and 44 may be controlled either manually or by means of known types of automatic control devices.

Following actuation of the transfer cylinders 42 and 44, the guide assembly 46 is raised and the cross feeding rollers 36 are lowered to drop the blended rows of bricks onto the blending conveyor 60. The blending conveyor is then started to move the blended rows of bricks onto conveyor 68 which is subsequently stopped with the bricks in position over the spreader assembly 72. The cross feed rolls 76 are then raised to lift the blended brick rows above the belt 70 and the rolls 76 are then rotated in a known manner to spread the bricks. Upon lowering of the feed rolls 76, the conveyor 68 is restarted to carry the spread brick rows into an inspection station (not shown), following which the bricks pass into a packing station.

Should it be desired to add an occasional row of accent bricks to the blend, the cylinder 98 is actuated during a blending operation to move a row of accent bricks from the table 84 into the blending station. Following retraction of the piston rod 96, the cylinder 90 is actuated to advance a succeeding brick row into position against the wall 92. The cylinders 90 and 98 may be either manually actuated or controlled by suitable automatic control devices in phase with the guide assembly 46, cross feeding rollers 36 and the acceleration and blending conveyors.

The number of hack nests may be readily increased by adding one or more additional gripper-trolley assemblies and associated supporting mechanism. The conveyors would of course have to be extended for such expansion.

Although belt-type conveyors have been shown for transporting the brick rows, it will be apparent that other types of conveying means could if desired be employed to achieve the same results.

From the foregoing it will be apparent that the present invention provides a wide flexibility in the blend ratio of the bricks, permitting the transfer onto the blended brick conveyor of any desired brick ratio. As indicated above, the number of brick transfer cylinders may be increased and more typically would comprise eleven cylinders adjacent each staging area, the reduced number illustrated having been chosen to simplify the disclosure.

Manifestly, changes in the details of construction can be effected by those skilled in the art without departing from the spirit and scope of the present invention.

I claim:

1. Apparatus for selectively blending rows of bricks, comprising a brick blending station, said blending station including a brick blending area, a first brick staging area on one side of said brick blending area, and a second brick staging area on the opposite side of said blending area from said first staging area, means for delivering a plurality of rows of bricks to said first staging area in a spaced parallel disposition, means for delivering a plurality of rows of bricks to said second staging area in a spaced parallel disposition parallel to the brick rows delivered to said first staging area, transfer means for selectively moving rows of bricks from said first staging area into said blending area, transfer means for selectively moving rows of bricks from said second staging area into said blending area to provide a blended array of brick rows, guide means in said blending station for guiding said brick rows into said blending area, said guide means comprising a plurality of parallel fence elements and means for selectively raising or lowering said fence elements into an operative position within said blending station, and conveyor means for removing the blended array of bricks from said blending area.

2. Apparatus for selectively blending rows of bricks, comprising a brick blending station, said blending station including a brick blending area, a first brick staging area on one side of said brick blending area, and a second brick staging area on the opposite side of said blending area from said first staging area, first conveyor means for delivering a plurality of rows of bricks to said first staging area in a spaced parallel disposition, second conveyor means for delivering a plurality of rows of bricks to said second staging area in a spaced parallel disposition parallel to the brick rows delivered to said first staging area, said first and second conveyor means comprising parallel conveyor assemblies, each said conveyor assembly including a brick loading section and an acceleration section, means adjacent said brick loading sections of said conveyor assembly for supporting brick hacks, means for transferring bricks from said brick hacks selectively to either of said brick loading sections of said conveyor assemblies, transfer means for selectively moving rows of bricks from said first staging area into said blending area, transfer means for selectively moving rows of bricks from said second staging area into said blending area in alternating relation with the rows from said first staging area to provide a blended array of brick rows, and conveyor means for removing the blended array of bricks from said blending area.

3. The invention as claimed in claim 2 including guide means in said blending station for guiding said brick rows into said blending area.

4. The invention as claimed in claim 3 wherein said guide means comprises a plurality of parallel fence elements, and means for selectively lowering or raising said fence elements into or out of an operative position within said blending station.

5. The invention as claimed in claim 2 wherein said brick transfer means comprises cross feed rolls selectively positionable within said blending station, and a plurality of fluid actuated cylinders disposed adjacent each said brick staging area for selectively transferring brick rows into said blending area.

6. The invention as claimed in claim 2 including means for selectively introducing individual rows of contrasting bricks into said blending station.

7. The invention as claimed in claim 2 wherein said means for transferring bricks from the brick hack to said conveyor assemblies comprises a gripper-trolley assembly arranged transversely of said conveyor assemblies and adapted to selectively transfer grids of bricks from the brick hacks to the conveyor assemblies.

8. The invention as claimed in claim 2 wherein said brick loading sections of said conveyor assemblies each include brick defacing assemblies adapted to lift the upper layer of the brick grids from the conveyor, and replace it in an inverted disposition on the conveyor adjacent the grid lower layer.

9. The invention as claimed in claim 2 including means adjacent each said brick loading conveyor section for removing excess bricks from the brick rows passing therealong.

10. The invention as claimed in claim 2 wherein said acceleration sections of said conveyor assemblies and said conveyor means for removing the blended array of bricks from said blending area comprise belt conveyors each including a plurality of spaced belts.

11. The invention as claimed in claim 10 including cross feed rolls in said blending station disposed between the belts of said acceleration conveyor sections and said blending area conveyor means, and means for selectively raising or lowering said cross feed rolls.

12. Apparatus for selectively blending rows of bricks, comprising a brick blending station, said blending station including a brick blending area, a first brick staging area on one side of said brick blending area, and a second brick staging area on the opposite side of said blending area from said first staging area, first conveyor means for delivering a plurality of rows of bricks to said first staging area in a spaced parallel disposition, second conveyor means for delivering a plurality of rows of bricks to said second staging area in a spaced parallel dispostion parallel to the brick rows delivered to said first staging area, each said conveyor means including a brick loading section and a brick separating section, brick support means adjacent said brick loading sections of said conveyor means for supporting bricks, means for transferring bricks from said brick supporting means selectively to either of said brick loading sections of said conveyor means, transfer means for selectively moving rows of bricks from said first staging area into said blending area, transfer means for selectively moving rows of bricks from said second staging area into said blending area in alternating relation with the rows from said first staging area to provide a blended array of brick rows, and conveyor means for removing the blended array of bricks from said blending area.

* * * * *